May 8, 1928.  1,668,666

H. F. WINKELMANN

CONCRETE PIPE JOINT

Filed June 29, 1925   2 Sheets-Sheet 1

Inventor
Henry F. Winkelmann
By C.A.Snow&Co.
Attorneys.

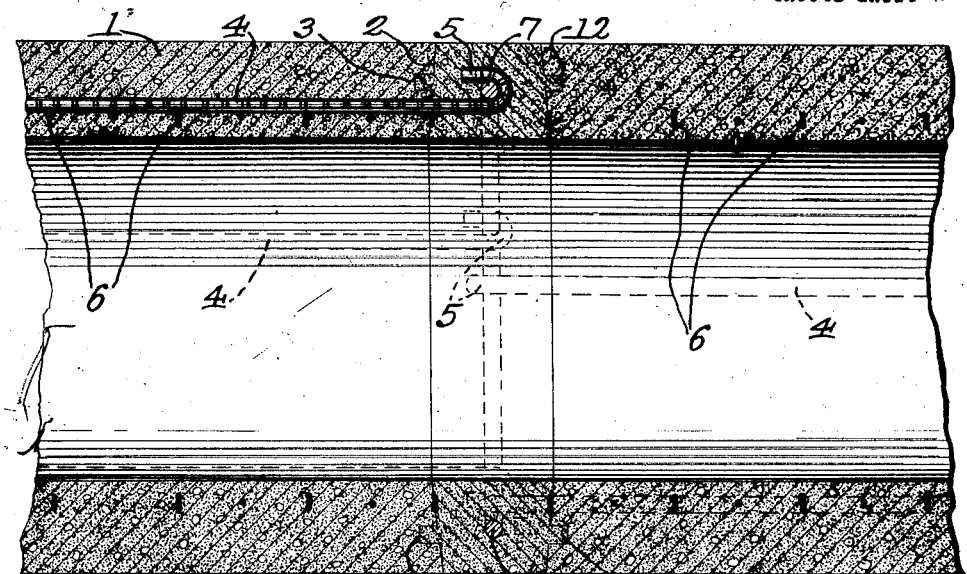
Fig. 3.
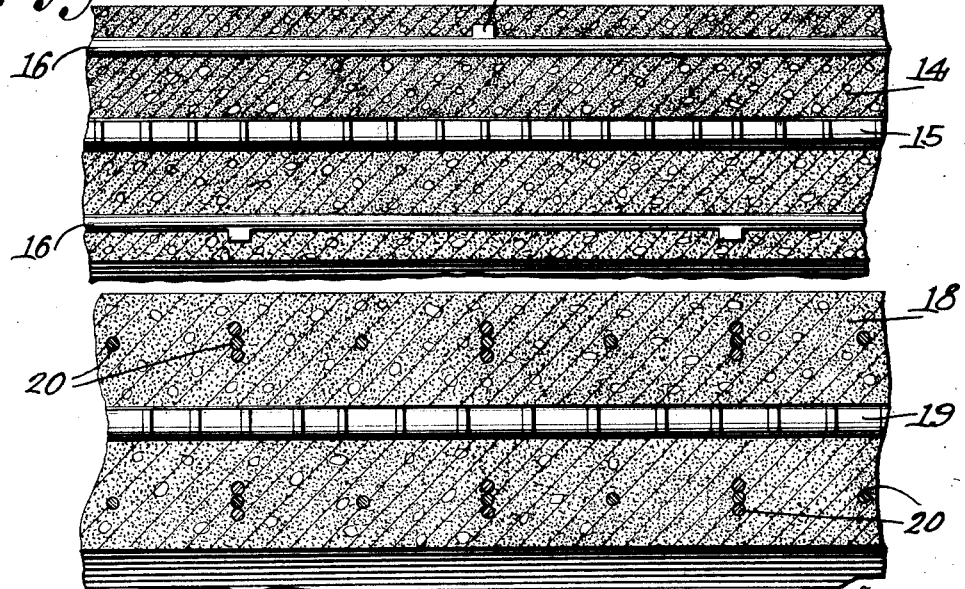
Fig. 4.
Fig. 5.
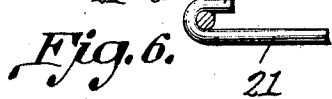
Fig. 6.
Inventor
Henry F. Winkelmann Patented May 8, 1928.

1,668,666

UNITED STATES PATENT OFFICE.

HENRY F. WINKELMANN, OF BILLINGS, MONTANA.

CONCRETE-PIPE JOINT.

Application filed June 29, 1925. Serial No. 40,356.

This invention aims to provide novel means whereby the ends of sections of concrete pipe may be joined together to form a monolithic pipe line. The invention aims, further, to provide novel means for strengthening and reinforcing a concrete pipe.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

In the accompanying drawings:—

Figure 1:
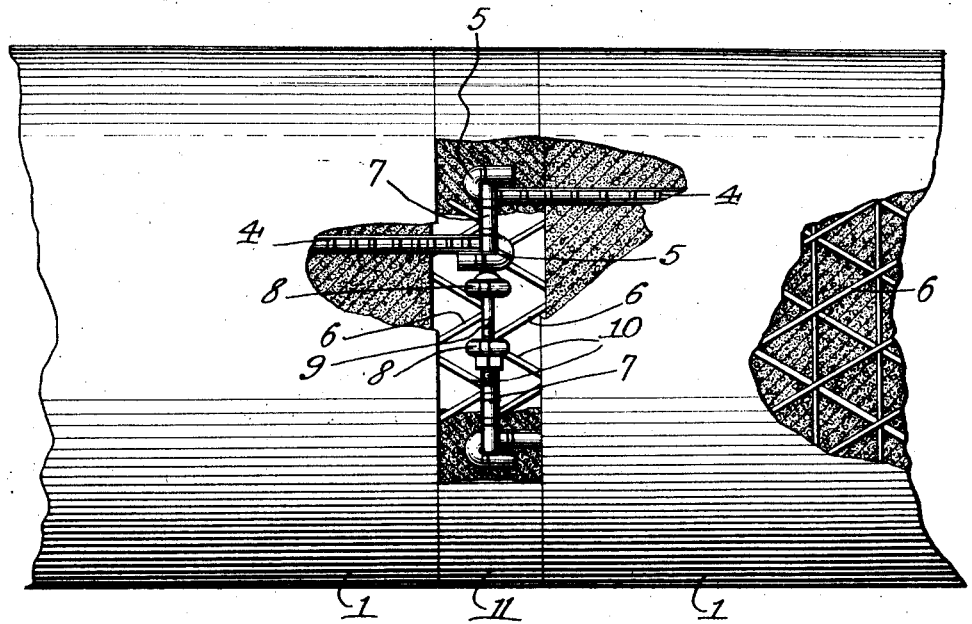
Figure 2:
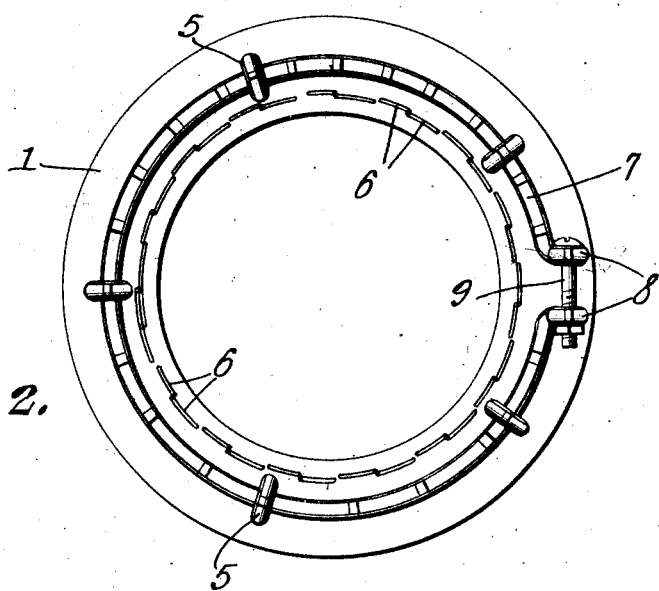

Figure 1 shows in plan, two pipes constructed in accordance with the invention; Figure 2 is an end elevation; Figure 3 is a longitudinal section; Figures 4 and 5 are fragmental longitudinal sections showing modifications; Figure 6 is a sectional detail showing a further modification.

The numeral 1 marks a concrete pipe which may be of any thickness, diameter and cross section, depending upon the duty which the pipe is to perform. At each end, the piece 1 is inwardly beveled, as shown at 2. In each end of the pipe 1 there is a continuous circumferential groove 3. Combined anchor and reinforcing members 4, in the form of rods, extend through the pipe 1 from end to end, the members 4 projecting beyond the ends of the pipe, and terminating in seats 5, which may be hooks. The rods 4 may be of any desired cross section, and preferably are made of commercial reinforcing metal, as indicated in the drawings. Within the pipe 1 is located a reinforcement 6, disposed, if desired, inwardly of the anchor rods 4. The reinforcement 6 projects beyond the ends of the pipe 1. The reinforcement 6 may be in the form of a metal netting, as indicated clearly in Figure 1.

Two pipes 1, constructed as above described, are disposed as shown in Figure 3, with their ends spaced apart a little way. With the hooks 5 of the members 4 of the two pipes, is engaged a connecting device 7, which may be in the form of a ring, the ring being supplied at its ends with eyes 8 or the like, the eyes receiving a tightener 9, such as a bolt and nut. It is to be understood that the eyes 8 may be fashioned in various ways, depending upon the kind of stock out of which the connecting device 7 is made. Through the instrumentality of the tightener 9, the connecting device 7 is held securely in the hooks 5, the ends of the netting reinforcements 6 preferably meet but do not overlap upon each other, between the ends of the pipes 1, as indicated at 10 in Figure 1. The space between the ends of the pipes 1 is filled with concrete, to form an annular coupling 11 wherein the ends of the anchor and reinforcing members 4, the hooks 5, the connecting device 7, the coupling 11 and the tightener 9 are embedded. In the forming of the coupling 11, the constituent concrete thereof enters the grooves 3 of the pipes 1 to form annular ribs 12 on the part 11. Owing to the fact that the ends of the pipes 1 are inwardly beveled as at 2, the coupling 11 assumes, in cross section, the form of a truncated wedge, thereby promoting the security of the joint between the part 11 and the pipes 1, the ribs 12 and the grooves 3 enhancing that security. The result obtained is a continuous monolithic pipe line, novel means being provided for reinforcing the pipe sections, and for holding them in alinement whilst the coupling member 11 is being formed.

In Figure 4, the pipe is designated by the numeral 14, the anchor and reinforcing member, corresponding to the member 4, being marked by the numeral 15. In this form of the invention, the reinforcement, represented in Figure 1 by the netting 6, is replaced by any desired number of longitudinal rods 16, embedded in the pipe 14 and located inwardly and outwardly of the rods 15, the rods 16 having projecting lugs 17 promoting the hold of the rods 16 on the concrete.

Passing to Figure 5, the pipe appears at 18, the rod 19 corresponding to the rod 4 of Figure 1. In this form of the invention, netting reinforcements 20 are embedded in the pipe and are disposed both inwardly and outwardly of the rods 19.

The anchor and reinforcing members appear at 21 in Figure 6, and have hooks 22. The ends of each anchor and reinforcing rod 21 are disposed out of alinement, transversely of the pipe, so that one circle of the hooks 22 lies within the other circle of hooks, the connecting device being in the form of a link 23 engaged with the hooks.

Having thus described the invention, what is claimed is:—

In a device of the class described, a pair of pipes the ends of which are inwardly beveled from the extreme outer surface of the pipes to the extreme inner surface of the pipes, an annular coupling of concrete formed between the beveled ends of the pipes, the coupling being in the shape of a truncated wedge in cross section, the smaller end of the wedge being in substantial alinement with the extreme outer surface of the pipes, and the wider end of the wedge being in substantial alinement with the extreme inner surface of the pipes, the coupling and the beveled ends of the pipes being provided with annular interengaged tongue and groove elements, rods extended longitudinally of the pipes and embedded therein, the rods being prolonged beyond the ends of the pipes and having seats, a connecting means engaged in the seats, and reinforcements embedded in the pipes and extended beyond the ends of the pipes, the prolonged portions of the rods, the seats, the extended parts of the reinforcements, and the connecting means, being housed and embedded in the coupling.

In testimony that I claim the foregoing as my own, I have hereto affixed my signature.

HENRY F. WINKELMANN.